Aug. 7, 1951    M. R. THORBURN    2,563,435
DEVICE FOR PREFOCUSING LAMPS
Filed Nov. 18, 1949
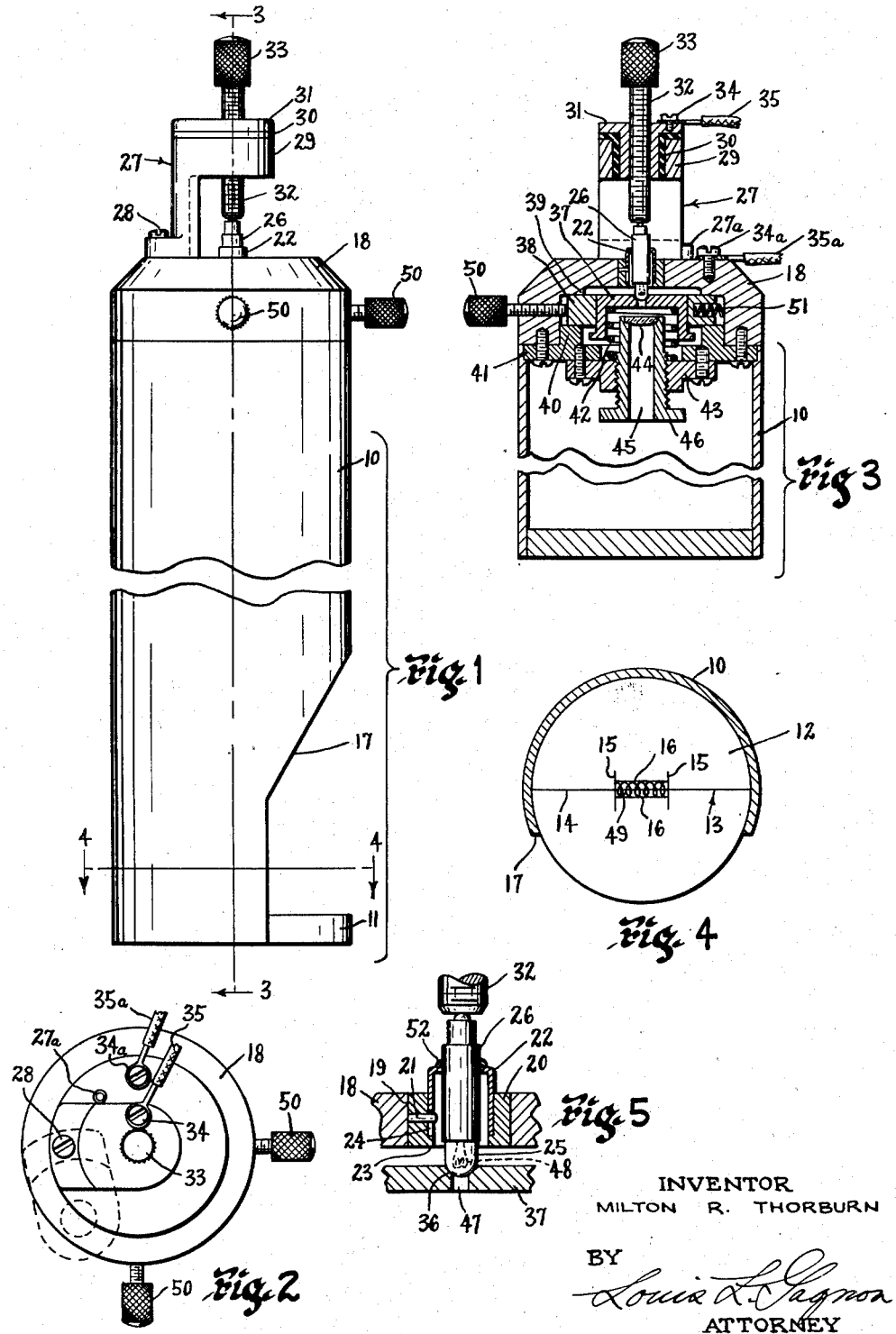
INVENTOR
MILTON R. THORBURN
BY
Louis L. Gagnon
ATTORNEY Patented Aug. 7, 1951

2,563,435

UNITED STATES PATENT OFFICE 2,563,435

DEVICE FOR PREFOCUSING LAMPS

Milton R. Thorburn, Sturbridge, Mass., assignor to American Optical Company, Southbridge, Mass., a voluntary association of Massachusetts Application November 18, 1949, Serial No. 128,122

10 Claims. (Cl. 316—29)

This invention relates to improvements in devices for aligning lamps and has particular reference to a device for use in prelocating the filament of incandescent lamps with respect to a base portion which becomes a permanent part of said lamps during the subsequent use thereof.

It is a principal object of this invention to provide a device for prelocating the filaments of incandescent lamps in desired relation to the base portions thereof whereby the lamps may be interchangeably used with lens systems of instruments or the like and will be consistently spaced at a predetermined fixed distance from said systems and axially aligned with respect thereto.

Another object is to provide a device for supporting an incandescent lamp for initial movement toward and away from a fixed object such as a lens and final positionment at a desired distance from the lens, and for axial movement so as to produce an image of the lamp filament which will be located as desired on a test screen.

Another object is to provide a device of the above character having means for holding a substantially tubular sheath in which the lamp is adjustably located and to which the lamp is fixedly attached subsequent to the final adjustment thereof with respect to the lens.

Another object is to provide a device of the above character which is simple in its construction, efficient in its operation, and relatively inexpensive to manufacture.

Other objects and advantages will become apparent from the following description taken in connection with the accompanying drawing, in which:

Fig. 1 is a side elevational view of a device embodying the invention;

Fig. 2 is a top plan view of the device shown in Fig. 1;

Fig. 3 is a sectional view taken on line 3—3 of Fig. 1;

Fig. 4 is a fragmentary sectional view taken on line 4—4 of Fig. 1 and looking in the direction of the arrows; and Fig. 5 is a fragmentary sectional view of the lamp holding means.

In the manufacture of optical instruments, it is often necessary to provide the instruments with means for illuminating an object or a cavity which is to be examined and in such instruments it is necessary that the illumination be projected in such a manner that the utmost efficiency is obtained. This is particularly true in instruments such as ophthalmoscopes wherein illumination is generally provided by an incandescent lamp mounted within the instrument and projected through a lens and prism to a predetermined focal point, and in such cases, in order to obtain the greatest efficiency, the lamps are mounted in such a manner that the filament of the lamps are spaced at a predetermined distance from the lens and axially aligned so that upon passing through the prism the image of the filament will be substantially parallel with the forward edge of the prism.

Such devices generally embody holding means for the lamps which are fixedly attached to the lamps and adapted to be inserted in the instrument only to a predetermined distance with respect to the lens and only in the desired axial relation with the system whereby the desired result is obtained.

The present invention provides means for aligning incandescent lamps in the holding means therefor so that when the illuminating device is inserted in an instrument such as an ophthalmoscope the lamp will be entirely pre-focused and axially aligned with respect to the lens system so that the greatest efficiency is provided.

In the embodiment shown in the drawing, wherein like characters of reference designate like parts throughout the several views, there is illustrated a substantially vertically disposed tubular housing 10 having at its lower end a disc-like base member 11 on the inner surface of which is provided a test screen or target 12 having a reticle 13 thereon which embodies a horizontal line 14 passing through the center of the device and which is intersected by a pair of spaced parallel short lines 15 disposed normal to the line 14 and having a pair of spaced parallel lines 16, one on either side of the line 14 and connecting the lines 15 to form a rectangular structure. The reticle 13 may be provided in any conventional manner on the surface of the base 11 such as by printing, stenciling, engraving or the like.

The front of the housing 10 is cut away at its lower end as indicated at 17 so that the test screen 12 can be easily viewed by the operator of the device.

At the upper end of the housing is positioned a cap 18 which is provided with a central vertical bore 19 (Figs. 3 and 5) in which is fixedly located a bushing 20. The bushing 20 carries a fixed inwardly extending pin 21 and is adapted to slidably receive a substantially tubular sheath 22 therein. The bushing 20 is further provided with an inwardly extending annular shelf 23 adjacent its inner end upon which the inner end of the sheath 22 is adapted to rest. The sheath 22 is provided at its inner end with a longitudinal slot 24 in one side thereof, which slot 24 is adapted to receive the end portion of the pin 21 and thus prevent the sheath from turning in the bushing 20. In this manner the sheath 22 is prelocated in a position similar to the position it will assume when used in an ophthalmoscope or similar optical instrument.

In accordance with this invention, an incandescent lamp 25 is slidably positioned within the sheath 22 with its base 26 directed away from the test screen 12. A bracket 27 is pivotally connected by a stud 28 to the cap 18 and has a portion 29 thereof extending over the lamp 25. The portion 29 is provided with a central longitudinal bore which is substantially coaxial with the bore 19 in the cap 18 and which has an insulating bushing 30 therein. A plug 31 of conductive material is fixedly located within the insulating bushing 30 and threadedly carries the shaft portion 32 of an adjusting member 33. The inner end of the shaft 32 engages the lamp base 26 and when threaded inwardly of the plug 31 will simultaneously force the lamp 25 in a direction toward the test screen 12.

The bracket 27 is pivoted to the cap 18, however, so that the portion 29 thereof can be swung out of overlying relation with the lamp holding means, as indicated by dotted lines in Fig. 2, thus permitting the lamp to be easily removed from or inserted in the device, and when swung back against a stop 27a, it will be positioned so that the shaft 32 will engage the lamp base 26.

The plug 31 and cap 18 are each provided with a terminal 34 and 34a respectively to which are connected wires 35 and 35a leading to a suitable source of electric current (not shown). Thus, there is provided a circuit to the lamp 25 from terminal 34 through plug 31 and shaft 32 and from the terminal 34a through cap 18, bushing 20 and sheath 22, which will cause the lamp to be illuminated.

When a lamp 25 is positioned in the device it may be forced inwardly of the sheath 22 until its inner end is positioned in a recess 36 formed in the adjacent surface of a block 37. The block 37 is carried by an encircling ring 38 which is positioned between an inner annular portion 39 of the cap 18 and an annular ridge portion 40 of a retainer 41 screwed or otherwise secured to the cap 18.

The lower portion of the block 37 is hollowed out for reception of one end of a coil spring 42 which has its opposed end seated upon a ring-like plate member 43 which is screwed or otherwise attached to the retainer 41. Thus, the block 37 is continuously urged in a direction toward the lamp 25 by the spring 42. However, as the adjusting member 33 is turned, the lamp 25 will force the block 37 inwardly within the ring 38. In this way, the lamp 25 can be moved toward and away from a lens 44 which is carried in a central bore 45 of a supporting member 46 threadedly supported in the plate member 43.

The block 37 is provided with an aperture 47 (Fig. 5) communicating with the recess 36 so that illumination from the lamp 25 may be directed through the lens 44 and bore 45 onto the test screen 12.

The lamp 25 can thus be adjusted longitudinally of the sheath 22 toward and away from the lens 44 which will thereby space the lamp filament 48 at the desired distance from the lens 44 whereby the illumination will be properly focused on the screen 12.

However, since it is also desired to angularly and axially align the lamp, there is also provided means for further adjustment of the lamp in the sheath 22. It is to be understood that the lamp 25 can be easily axially aligned by rotation about its longitudinal axis upon use of a simple tool so as to position the image 49 of the filament (Fig. 4) in substantially parallel relation with the reticle line 14 on the test screen 12.

In order to angularly align the lamp, there are provided a pair of laterally extending adjusting members 50 which are threadedly mounted through the side walls of the cap 18 at substantially 90° angles to one another. The inner ends of the adjusting members 50 engage the periphery of the block supporting ring 38 and upon being turned inwardly are adapted to urge the ring 38 and block 37 laterally against the tension exerted by a pair of springs 51, one of which is located in diametrical opposition to each of the adjusting members 50 between the ring 38 and side wall of the cap 18.

Thus, lateral movement of the block 37 by either adjusting members 50 will cause angular displacement of the lamp 25. Such adjustment can be made to properly position the image 49 of the lamp filament between the spaced pairs of reticle lines 15 and 16 on the test screen 12.

When the filament image 49 is properly located on the test screen and the filament 48 properly spaced from the lens 44, the lamp base 26 is fixedly attached to the sheath 22 as by soldering or the like, indicated by numeral 52 in Fig. 5. This will cause the sheath 22, upon removal from the device, to retain the lamp 25 in adjusted relation therewith so that when the assembled lamp and sheath are inserted in an optical instrument such as an ophthalmoscope the lamp will be automatically positioned in pre-focused and axial alignment for proper and efficient operation of the instrument without requiring further adjustments.

From the foregoing it will be seen that simple, efficient and economical means have been provided for accomplishing all of the objects and advantages of the invention. While the novel features of the invention have been described and are pointed out in the annexed claims, it will be understood that many changes may be made in the details of construction shown and described without departing from the spirit of the invention. I, therefore, do not wish to be limited to the exact details shown and described as the preferred only are set forth by way of illustration.

I claim:

1. In a device of the character described, the combination of a supporting member, a sheath carried by said supporting member and shaped to be held in predetermined position therein, a lamp positioned within said sheath, a retainer carried by said supporting member, a lens mounted in said retainer, and adjusting means carried by said supporting members and having separately adjustable portions engaging and supporting the lamp for adjusting the lamp within said sheath in a direction toward and away from said lens and in directions transversely thereof.

2. In a device of the character described, the combination of a supporting member, a sheath carried by said supporting member and shaped to be held in predetermined position therein, a lamp positioned within said sheath and adjustable longitudinally thereof, a retainer carried by said supporting member and having a lens fixedly positioned therein, a test screen spaced at a predetermined distance from said lens, and adjusting means carried by said supporting member and having separately adjustable portions engaging and supporting the lamp for adjusting the lamp within said sheath in a direction toward and away from said lens and in directions transversely thereof to focus illumination from said lamp as desired on said test screen.

3. In a device of the character described, the combination of a supporting member, a sheath carried by said supporting member and shaped to be held in predetermined position therein, a lamp positioned within said sheath and adjustable longitudinally thereof, a retainer carried by said supporting member and having a lens fixedly positioned therein, a test screen spaced at a predetermined distance from said lens, resilient means carried by said retainer and engaging said lamp for urging the lamp in a direction away from said lens, adjusting means carried by said supporting member and engaging said lamp for adjusting the lamp longitudinally of said sheath against the tension of said resilient means in a direction toward said lens, and angling means carried by said supporting member and having portions engaging said retainer for adjusting said lamp in a direction transversely of said lens.

4. In a device of the character described, the combination of a supporting member, a sheath carried by said supporting member and shaped to be held in predetermined position therein, a lamp positioned within said sheath and adjustable longitudinally thereof, a retainer carried by said supporting member and having a lens fixedly positioned therein, a test screen spaced at a predetermined distance from said lens, and adjusting means carried by said supporting member and having separately adjustable portions engaging and supporting the lamp for adjusting the lamp within said sheath in a direction toward and away from said lens and angularly thereof to focus illumination from said lamp as desired on said test screen comprising a block member disposed between said retainer and lamp and having a recess therein in which the bulb end of the lamp is seated and having an opening therethrough communicating with said recess for permitting illumination from the lamp to be directed to the lens and test screen, resilient tension means between said block and retainer for yieldably urging said block and lamp in a direction away from said lens, and an adjusting screw carried by said supporting member and engaging the base end of said lamp for adjusting said lamp within said sheath in a direction toward said lens.

5. In a device of the character described, the combination of a supporting member, a sheath carried by said supporting member and shaped to be held in predetermined position therein, an incandescent lamp positioned within said sheath, a retainer carried by said supporting member and having a portion engaging said lamp and having a lens therein, a test screen spaced a predetermined distance from said lens for receiving a projected image of the filament of said lamp, and adjusting means carried by said supporting member and having separately adjustable portions engaging said retainer for angling the lamp within said sheath to position the projected image of the filament of said lamp as desired on the test screen.

6. In a device of the character described, the combination of a supporting member, a sheath carried by said supporting member and shaped to be held in predetermined position therein, an incandescent lamp positioned within said sheath, a retainer carried by said supporting member and having a lens therein, a test screen spaced a predetermined distance from said lens for receiving a projected image of the filament of said lamp and having reference marks thereon, spacing means carried by said supporting member and having separately adjustable portions engaging and supporting the lamp for spacing the lamp at a desired distance from said lens, and adjusting means carried by said supporting member for angling the lamp within said sheath to position the projected image of the filament of said lamp as desired on the test screen comprising a laterally adjustable ring-like member positioned between said retainer and lamp, a block member carried within said ring-like member and laterally adjustable therewith, said block member having a recess therein in which the bulb end of the lamp is seated and having an opening therein communicating with said recess for permitting illumination from the lamp to be directed to said lens and test screen, a plurality of spaced adjusting screws carried by said supporting member and bearing against said ring-like member, and a plurality of spaced spring members positioned in diametrical opposition to said adjusting screws between said supporting member and ring-like member, said adjusting screws being operable to move the ring-like member and block against the tension of the spring to angle said lamp so as to position the image of the filament as desired on the test screen.

7. In a device of the character described, the combination of a supporting member, a sheath carried by said supporting member and shaped to be held in predetermined position therein, an incandescent lamp positioned within said sheath, a retainer carried by said supporting member, a lens mounted in said retainer, a test screen spaced a predetermined distance from said lens for receiving illumination from said lamp and having reference marks thereon with which an image of the lamp filament is alignable, and adjusting means carried by said supporting member and having separately adjustable portions engaging and supporting the lamp for adjusting the lamp within said sheath to direct illumination as desired on said test screen.

8. In a device of the character described, the combination of a supporting member, a sheath carried by said supporting member and shaped to be held in predetermined position therein, an incandescent lamp positioned within said sheath and adjustable longitudinally thereof, a retainer carried by said supporting member and having a lens fixedly positioned therein, a test screen spaced at a predetermined distance from said lens for receiving illumination from said lamp and having reference marks thereon with which an image of the lamp filament is alignable, and adjusting means carried by said supporting member and having separately adjustable portions engaging and supporting the lamp for adjusting the lamp within said sheath in a direction toward and away from said lens and angularly thereof to focus illumination from said lamp as desired on said test screen comprising resilient means carried by said retainer and engaging said lamp for urging the lamp in a direction away from said lens, an adjusting screw carried by said supporting member and engaging said lamp for adjusting the lamp within said sheath against the tension of said resilient means in a direction toward said lens, and angling means carried by said supporting member and engaging said lamp for angling the lamp within said sheath to position the projected image of the filament of said lamp as desired on the test screen.

9. In a device of the character described, the combination of a supporting member, a sheath carried by said supporting member and shaped to be held in predetermined position therein, an incandescent lamp positioned within said sheath and adjustable longitudinally thereof, a retainer carried by said supporting member and having a lens fixedly positioned therein, a test screen spaced at a predetermined distance from said lens for receiving illumination from said lamp and having reference marks thereon with which an image of the lamp filament is alignable, adjusting means carried by said supporting member for adjusting the lamp within said sheath in a direction toward and away from said lens and transversely thereof to focus illumination from said lamp as desired on said test screen comprising a block member disposed between said retainer and lamp and having a recess therein in which the bulb end of the lamp is seated and having an opening therethrough communicating with said recess for permitting illumination from the lamp to be directed to the lens and test screen, resilient tension means between said block member and retainer for yieldably urging said block and lamp in a direction away from said lens, and an adjusting screw carried by said supporting member and engaging the base end of said lamp for adjusting said lamp within said sheath in a direction toward said lens, and adjusting screws carried by said supporting member and engaging said block member for angling the lamp within said sheath to position the projected image of the filament of said lamp as desired on the test screen comprising a laterally adjustable ring-like member positioned in encircling relation with said block member, a plurality of spaced adjusting screws mounted in said supporting member and bearing against said ring-like member, and a plurality of spaced spring members positioned in diametrical opposition to said adjusting screws between said supporting member and ring-like member, said adjusting screws being operable to move the ring-like member and block laterally against the tension of the spring so as to angle said lamp and position the image of the filament as desired on the test screen.

10. A device of the character described comprising the combination of a supporting member having means for holding a lamp receiving sheath in a predetermined position, a retainer carried by said supporting member, a lens mounted in said retainer, and adjusting means carried by said supporting member and having separately adjustable portions to engage and support a lamp when positioned in the sheath for adjusting said lamp within said sheath in a direction toward and away from said lens and in directions transversely thereof.

MILTON R. THORBURN.

REFERENCES CITED

The following references are of record in the file of this patent:

UNITED STATES PATENTS

| Number | Name | Date |
|---|---|---|
| 1,241,512 | Harrington | Oct. 2, 1917 |
| 2,132,369 | Geiger et al. | Oct. 4, 1938 |
| 2,136,237 | Elmendorf | Nov. 8, 1938 |